J. E. RUBY.
ANIMAL TRAP.
APPLICATION FILED JAN. 16, 1917.
1,250,022.
Patented Dec. 11, 1917.
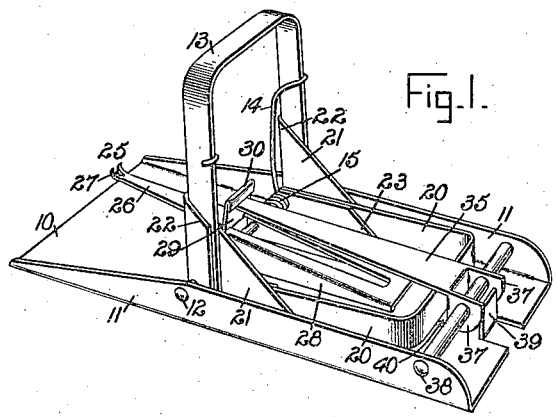
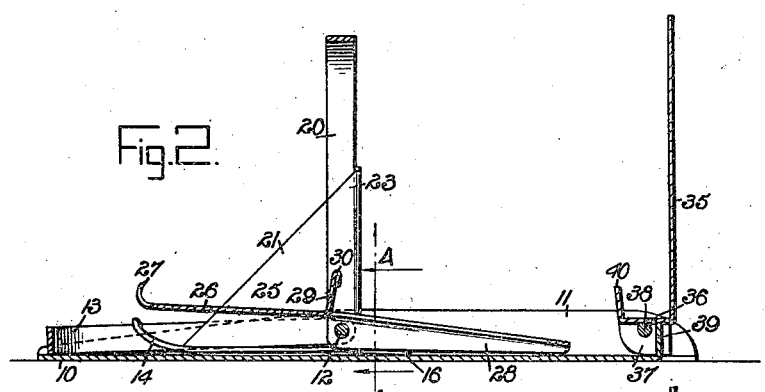
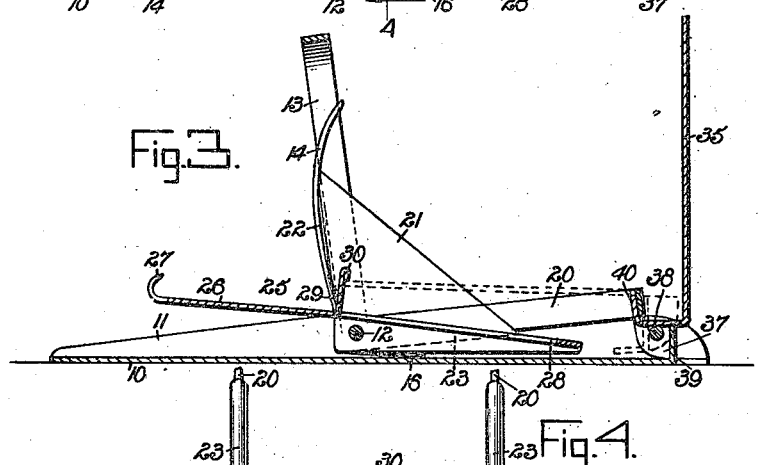
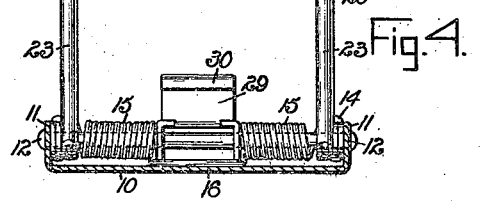
WITNESSES
INVENTOR
John E. Ruby
BY
ATTORNEYS

UNITED STATES PATENT OFFICE.

JOHN E. RUBY, OF INDIANAPOLIS, INDIANA.

ANIMAL-TRAP.

1,250,022.

Specification of Letters Patent.

Patented Dec. 11, 1917.

Application filed January 16, 1917. Serial No. 142,597.

*To all whom it may concern:*

Be it known that I, JOHN E. RUBY, a citizen of the United States, and a resident of Indianapolis, in the county of Marion and State of Indiana, have invented a new and Improved Animal-Trap, of which the following is a full, clear, and exact description.

The invention relates to animal traps having one or more spring-pressed jaws.

The object of the invention is to provide a new and improved animal trap which is simple and durable in construction and arranged to automatically lock the jaw or jaws when moved by the operator into active or inactive position. Another object is to permit of setting the trap without the operator using the hands.

In order to accomplish the desired result use is made of a base on which are mounted spring-pressed trapping means, a bait carrier mounted to swing on the base and provided with an angular retaining catch, and a locking lever fulcrumed on the base and adapted to lock the said trapping means in open active position, the free end of the said locking lever being adapted to engage the said retaining catch and the pivotal end of the said locking lever being provided with an angular arm adapted to be engaged by the said trapping means to swing the locking lever into locking engagement with the trapping means and to engage the free end of the said locking lever with the said retaining catch of the bait carrier.

A practical embodiment of the invention is represented in the accompanying drawings forming a part of this specification, in which similar characters of reference indicate corresponding parts in all the views.

Figure 1 is a perspective view of the animal trap with the parts in set position;

Fig. 2 is a sectional side elevation of the same with the parts in unset position;
Fig. 3 is a similar view of the same with the jaw in partly raised position; and Fig. 4 is a cross section of the same on the line 4—4 of Fig. 2.

The base 10 of the animal trap shown in Figs. 1, 2, 3 and 4 is preferably in the form of a metallic plate provided at the sides with struck-up side flanges 11 in which is held a transversely extending pivot 12 lo-
cated a distance from the forward end of the base 10. On the pivot 12 is mounted to swing up and down a jaw 13, preferably of U shape, and adapted to coact with the forward portion of the base 10 to trap the animal, as hereinafter more fully explained. The jaw 13 is pressed on by the ends of a spring 14 provided with two spaced coils 15 and with an arm 16 intermediate the said coils 15 and resting on the base 10. The pivot 12 extends loosely through the coils 15.

In order to set the jaw 13, use is preferably made of a foot piece 20 made U shape and mounted to swing loosely on the pivot 12. Arms 21 are mounted to swing loosely on the pivot 12 and each arm is provided at its forward end with a return bent portion 22 straddling the corresponding side arm of the jaw 13, and the rear end of each arm 21 is provided with a return bend 23 straddling the corresponding arm of the foot piece 20. The return bent portions 22 and 23 of each arm 21 extend approximately at a right angle one to the other, and the return bent portion 22 is bent outwardly while the return bent portion 23 extends inwardly to permit the foot piece 20 to fold within the jaw 13 when the trap is not used. When the jaw 13 is in inactive position on top of the forward portion of the base 10 and the foot piece 20 is swung upward into an approximately vertical position then the return bent portions 22 and 23 engage the corresponding side arms of the jaw 13 and the foot piece 20 respectively. The operator now by applying the foot to the forward edge of the foot piece 20 can swing the latter rearwardly and downwardly, and in doing so the foot piece carries the arms 21 along whereby an upward swinging movement is given to the jaw 13 against the tension of its spring 14.

In order to automatically lock the foot piece 20 and the jaw 13 in set position, the following arrangement is made: A bait carrier 25 is mounted to swing loosely on the pivot 12 approximately at the middle thereof, and this bait carrier 25 is provided with a forwardly extending member 26 terminating in points 27 for holding the bait. The bait carrier 25 is further provided with a rearwardly extending member 28 of sufficient weight to overbalance the forward member 26 and the bait carried thereby so that the member 28 normally rests on the base 10. The bait carrier 25 is further provided with an upwardly extending catch 29 located a short distance in front of the pivot 12, and the upper end of this catch 29 is provided at its rear face with a shoulder 30 adapted to be engaged by the free end of a locking lever 35 provided with an angular portion 36 having downwardly extending lugs 37 mounted to swing on a transverse pivot 38 held in the side flanges 11 near the rear ends thereof. A lug 39 is struck up from the base 10 and extends between the lugs 37 to hold the locking lever 35 against lateral shifting on the pivot 38. The heel portion 36 of the locking lever 35 is provided with an angular arm 40 adapted to be engaged by the middle portion of the foot piece 20 at the time the latter is swung rearwardly and downwardly by the operator applying the foot to the foot piece 20, as previously explained.

It is understood that when setting the trap the foot piece 20 is swung into vertical position and likewise the locking lever 35, as plainly indicated in Fig. 2, and then the operator swings the foot piece 20 downwardly and rearwardly, as previously explained, so that the middle portion of the foot piece 20 finally engages the angular portion 36 of the locking lever 35 to swing the latter downward and over the middle portion of the foot piece 20. When the free end of the locking lever 35 reaches the top of the catch 29 then the middle portion of the foot piece 20 engages the arm 40 and in doing so a further forcible downward swinging movement is given to the locking lever 35 whereby the free end thereof causes a slight swinging movement of the bait carrier 25 to engage the free end of the locking lever 35 with the under side of the shoulder 30 (see Fig. 1 and dotted lines in Fig. 3). When the operator now releases the pressure on the foot piece 20 the parts are held in set position owing to the locking lever 35 extending over the middle portion of the foot piece 20 and the free end of the locking lever 35 engaging the shoulder 30. The trap is now set with the jaw 13 in raised position. Now in case an animal nibbles at the bait held on the pins 27 of the bait carrier 25 then the forward end thereof is caused to swing downward whereby the shoulder 30 moves away from the free end of the locking lever 35 and consequently the foot piece 20 is unlocked and with it the jaw 13 to allow the spring 14 to swing the jaw 13 downward onto the neck of the animal to trap the same in conjunction with the base 10.

Having thus described my invention, I claim as new and desire to secure by Letters Patent:

1. An animal trap, comprising a base, a spring-pressed jaw mounted to swing on the said base and adapted to coact therewith, the said spring-pressed jaw being provided with a foot piece for moving the jaw into open position, a trigger fulcrumed on the said base and provided at its forward end with a bait carrier, the said trigger having a rearwardly extending overbalancing arm and an angular retaining catch extending upwardly and provided with a shoulder, and a locking lever fulcrumed on the said base and provided with an angular arm adapted to be engaged by the said foot piece to swing the said lever downward to extend over the foot piece and the free end of the said lever into engagement with the catch of the trigger.

2. In an animal trap, a spring-pressed jaw mounted to swing and provided at its fulcrum end with an angular arm and a foot piece mounted to swing and having its axis coinciding with the axis of the said jaw, the said foot piece being adapted to engage the said angular arm to swing the jaw into open active position, a bait carrier mounted to swing and having a forwardly extending member adapted to carry the bait and having a rearwardly extending member adapted to overbalance the said forward member, the said bait carrier having an upwardly extending integral catch immediately in front of the axis of the carrier, and a locking lever provided at its fulcrum end with an angular arm adapted to be engaged by the said foot piece to swing the locking lever downward over the said foot piece and to engage the free end of the locking lever with the said catch.

3. In an animal trap, a base provided with a transverse pivot, a spring-pressed jaw mounted to swing on the said pivot and adapted to coact with the base to trap the animal, a foot piece mounted to swing on the said pivot, a connecting arm fulcrumed on the said pivot and having bearings engaged by the said jaw and the said foot piece, a bait carrier mounted to swing on the said pivot and having an overbalancing rear end, the bait carrier having an upwardly extending catch, and a locking lever controlled by the said foot piece and adapted to engage the said catch, the locking lever being adapted to lock the foot piece in rearward set position.

4. In an animal trap, a pivoted and spring pressed jaw, a foot piece mounted on the pivot of the jaw, arms mounted on the pivot of the jaw and foot piece and having bent portions engaging the jaw and foot piece, a bait holder having a catch, and a locking lever for engaging the catch of the bait holder, said lever being operated by the foot piece to swing it over the foot piece into engagement with the catch of the bait-holder.

5. In an animal trap, a base having a lug at one end, a pivoted and spring pressed jaw mounted on the base, a pivoted bait holder having a catch, a pivoted foot piece operatively connected with the jaw, and a pivoted locking lever for engaging the catch of the bait holder, said lever having an angular portion from which project downwardly extending lugs by which the lever is pivoted, said angular portion being adapted to engage the lug of the base to hold the lever in vertical position.

JOHN E. RUBY.

Copies of this patent may be obtained for five cents each, by addressing the "Commissioner of Patents, Washington, D. C."